(12) United States Patent
Miller et al.

(10) Patent No.: US 7,872,382 B2
(45) Date of Patent: Jan. 18, 2011

(54) REGULATOR UNIT AND GENERATOR

(75) Inventors: Hans-Peter Miller, Stuttgart (DE);
Andreas Doeffinger, Leonberg (DE);
Uwe Knappenberger, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 398 days.

(21) Appl. No.: 10/572,786

(22) PCT Filed: Nov. 30, 2004

(86) PCT No.: PCT/EP2004/053183

§ 371 (c)(1),
(2), (4) Date: Mar. 21, 2006

(87) PCT Pub. No.: WO2005/064773

PCT Pub. Date: Jul. 14, 2005

(65) Prior Publication Data

US 2007/0035188 A1 Feb. 15, 2007

(30) Foreign Application Priority Data

Dec. 30, 2003 (DE) ................... 103 61 861

(51) Int. Cl.
*H02K 5/18* (2006.01)
*H02K 5/20* (2006.01)
*H02K 9/00* (2006.01)
(52) U.S. Cl. .................................. 310/64; 310/68 D
(58) Field of Classification Search .......... 310/64, 310/68 D
See application file for complete search history.

(56) References Cited

U.S. PATENT DOCUMENTS

| 5,095,235 | A | * | 3/1992 | Kitamura | 310/68 D |
| 5,621,265 | A | * | 4/1997 | Abadia | 310/68 D |
| 5,686,780 | A | * | 11/1997 | Adachi et al. | 310/68 D |
| 5,907,203 | A | * | 5/1999 | Chen et al. | 310/65 |
| 6,020,662 | A | * | 2/2000 | Chen et al. | 310/65 |
| 6,081,054 | A | | 6/2000 | Kashihara et al. | |
| 6,114,783 | A | * | 9/2000 | Asao | 310/58 |
| 2003/0127920 | A1 | * | 7/2003 | Yamazaki et al. | 310/58 |

FOREIGN PATENT DOCUMENTS

| EP | 0 669 696 | 8/1995 |
| EP | 0 731 550 | 9/1996 |
| EP | 1 326 321 | 7/2003 |

* cited by examiner

*Primary Examiner*—Quyen Leung
*Assistant Examiner*—Alex W Mok
(74) *Attorney, Agent, or Firm*—Michael J. Striker

(57) ABSTRACT

A regulator unit, in particular for varying an exciter current, preferably for generators of motor vehicles, is proposed, having a housing (13), in which the housing (13) has a wiper contact mounting region (16) with a guide (19) and wiper contacts (22) seated therein, having a regulator housing portion (25), in which an electronic controller unit and a regulator heat sink (28) are received, having a plug element (31) for electrically connecting the regulator unit (10) to external contact elements, and in which the regulator unit (10) has a first through opening (34) and a second through opening (37), by means of which openings the regulator unit (10) can be fastened to a housing (40) by means of two bolt elements (34). It is provided that the regulator heat sink (28) is located between the wiper contact mounting region (16) and the plug element (31).

13 Claims, 3 Drawing Sheets

REGULATOR UNIT AND GENERATOR

BACKGROUND OF THE INVENTION

From the prior art, a previously used generator with a regulator unit is known. This regulator unit serves to vary an exciter current of a rotor of this generator. This regulator unit has a housing, with which a wiper contact mounting region with a guide and wiper contacts seated therein is integrated. The electronic controller unit and a likewise electronic regulator heat sink are received in a regulator housing portion, and this regulator heat sink is relatively large and extends over large regions between two through openings, which serve to fasten the controller unit to an end plate of the generator. There was a need for a new design of the regulator unit, to improve the cooling of the regulator heat sink.

SUMMARY OF THE INVENTION

The regulator unit of the invention has the advantage that because of the location of the regulator heat sink between the wiper contact mounting region and the plug element, a markedly improved cooling action is possible. Both the wiper contact mounting region and the plug element bring about air guidance, so that markedly more air is directed across the regulator heat sink.

Because the wiper contact mounting region is located asymmetrically between the first through opening and the second through opening, an especially great spacing can be made possible between the wiper contact mounting region and the plug element. The quantity of cooling air is accordingly increased. While in the previous version the heat sink extends over wide regions between the through openings, and thus leads to especially high rigidity of the regulator heat sink, in the new design good vibration fatigue strength is also possible because the guide of the wiper contact mounting region, or its center line, has as its shortest spacing from the through opening of maximally 20 mm.

A further provision for improving the vibration fatigue strength of the regulator unit is attained by providing that for the through openings, by way of which the regulator unit can be fastened to the housing, and the center line of the wiper contact mounting region, certain angular spacings are defined.

To further optimize the vibration fatigue strength, it is provided that there is a further fastening point, between the second through opening and the wiper contact mounting region, which is located in a defined spacing range from the second through opening.

It is also provided that the second through opening and the further fastening point each have one bearing face for a mounting element, and the bearing faces are located at different levels in the axial direction of the through opening, preferably being spaced apart in this direction by up to a defined spacing.

Because of the location of the wiper contact mounting region and the plug element between the first through opening and the second through opening, it becomes possible for the corresponding base of the end plate not to block the flow courses, aligned with the through openings, across the regulator heat sink.

Because the wiper contact mounting region with its guide, the regulator housing portion, and the plug element are a single housing part integrally with one another, a compact housing is obtained.

BRIEF DESCRIPTION OF THE DRAWINGS

In the drawings, one exemplary embodiment of a regulator unit of the invention is shown.

DETAILED DESCRIPTION OF THE PREFERRED EMBODIMENTS

Figure 1:
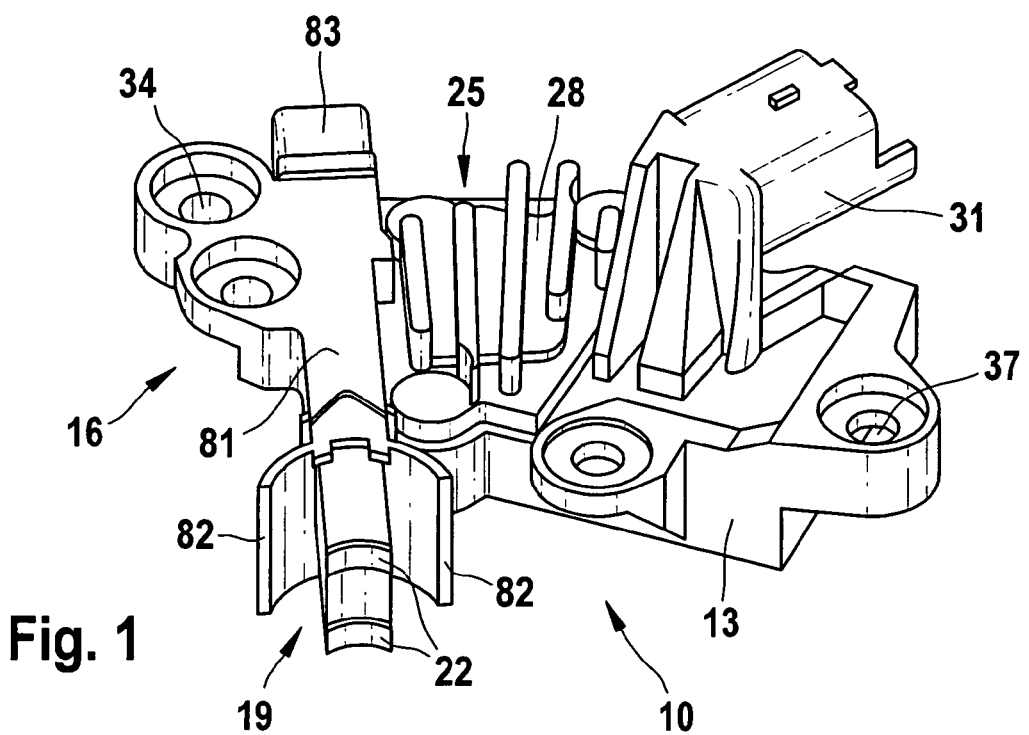
FIG. 1 in a three-dimensional view shows a regulator unit of the invention.

In FIG. 1, a three-dimensional view of a regulator unit 10 is shown. This regulator unit 10 serves to vary an exciter current of a rotor of an electrical machine, particularly a motor vehicle generator. This regulator unit 10 has a housing 13, which comprises various integrally joined-together housing portions. These housing portions includes first a so-called wiper contact mounting region 16, which essentially comprises a brush holder 81 with a guide 19. Wiper contacts 22 are located in this brush holder 81. The wiper contacts 22 are displaceable in this brush holder 81. On the open end of the brush holder 81, two plates 82 are located diametrically opposite one another. They serve to protect a wiper ring unit that contacts the wiper contacts 22. The plates 82 are formed integrally onto the brush holder 81. Diametrically opposite the open end of the brush holder 81, a closure 83 serves to close the side facing away from the open end of the brush holder 81. The closure 83 is preferably fastened to the brush holder 81 by means of a snap connection.

The wiper contact mounting region 16 is adjoined integrally by a regulator housing portion 25, as a further housing portion. An electronic controller unit, not visible here, is received in this regulator housing portion 25. This controller unit is located below the regulator heat sink 28. This regulator heat sink 28 is relatively large in area and covers the entire regulator housing portion 25. The regulator heat sink 28 is of aluminum and has some cooling fins on its surface.

This regulator housing portion 25 is adjoined by the next housing portion, the portion which carries a plug element 31. This plug element 31 serves to connect the regulator unit 10 electrically with external contact elements.

It is additionally provided that the regulator unit 10 has a first through opening 34 and a second through opening 37. They both serve as fastening points. By means of these two through openings, the regulator unit 10 can be fastened to a housing by means of two bolt elements. It is provided that the wiper contact mounting region 16 is located between the regulator housing portion 25 and the first through opening 34. It is also provided that the portion having the plug element 31 is located between the regulator housing portion 25 and the second through opening 37.

Thus the regulator unit 10 has as an essential characteristic that the regulator heat sink 28 is located between the wiper contact mounting region 16 and the plug element 31.

Thus a regulator unit 10, in particular for varying an exciter current, preferably for generators of motor vehicles, is provided, having a housing 13, where the housing 13 has a wiper contact mounting region 16 with a guide 19 and wiper contacts 22 seated therein, having a regulator housing portion 25, in which an electronic controller unit and a regulator heat sink 28 are received, having a plug element 31 for electrically connecting the regulator unit 10 to external contact elements; the regulator unit 10 has a first through opening 34 and a second through opening 37, by means of which the regulator unit 10 can be fastened to a housing 40 by means of two bolt elements 34, and the regulator heat sink 28 is located between the wiper contact mounting region 16 and the plug element 31.

As can be seen from the view in FIG. 1, it is provided that the wiper contact mounting region 16 is located asymmetrically between the first through opening 34 and the second through opening 37. This is intended for guiding the cooling air and leads to a large, radially extending cooling air cross section.

The wiper contact mounting region 16 and the plug element 31 are located between the first through opening 34 and the second through opening 37.

Figure 2:
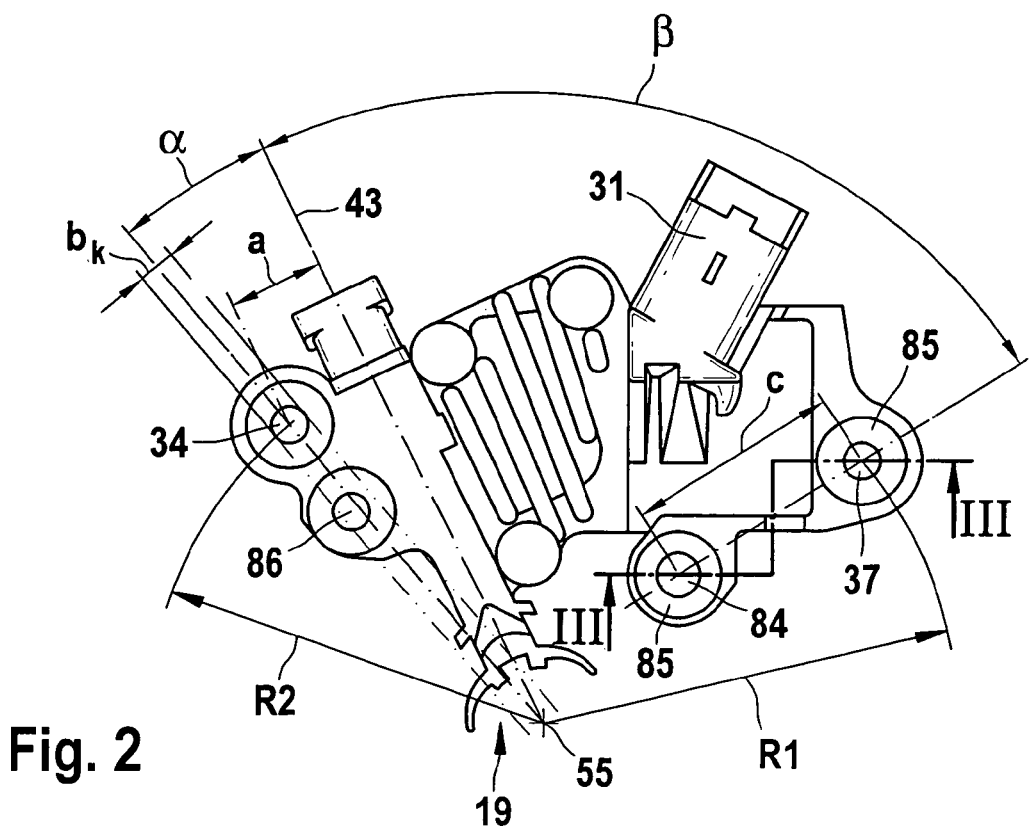
FIG. 2 shows some dimensional ratios of the regulator unit.

Some dimensional aspects of the regulator unit 10 will now be explained in further detail With the aid of FIG. 2.

The guide 19 of the wiper contact mounting region 16 has a center line, which may for instance be identical with an axis through a center of gravity of a wiper contact 22. The axis through the center of gravity here naturally has the same direction as the direction of motion of the wiper contacts 22. It is provided that the shortest spacing $a$ between the center line 43 and the first through opening 34 amounts to a maximum of 20 mm. As a reference point for the spacing $a$ to be ascertained with respect to the first through opening 34, the center point of this through opening applies.

It is also provided that the first through opening 34 has an angular spacing $\alpha$ from the center line 43 and the second through opening 37 has an angular spacing $\beta$ from the center line 43, and the ratio between $\beta$ and $\alpha$ is between 5.2 and 6.0, and in a second approximation preferably between 5.4 and 5.6. A ratio of 5.5 has proved to be an ideal value. As a reference point for determining the angle, the location of the generator axis, that is, the axis of rotation of the rotor, is intended.

In a further feature of the invention, it is provided that between the second through opening 37 and the wiper contact mounting region 16, there is a further fastening point 84, whose spacing from the second through opening 37 is between 11 mm and 36 mm. In a second approximation, a spacing c of between 25 mm and 33 mm is preferred. In a third approximation, a value between 28 mm and 31 mm is provided. The third fastening point 84 is accordingly intended as a so-called (B+) terminal.

With respect to the axis of rotation of the rotor, it is provided that the first fastening point 34 is located on a radius R2 and the second fastening point 37 is located on a radius R1. With regard to the radius R1, it is provided that the difference between the two radii is between +5% and +10% (R1>R2). The preferred value is 7.5%.

Figure 3:
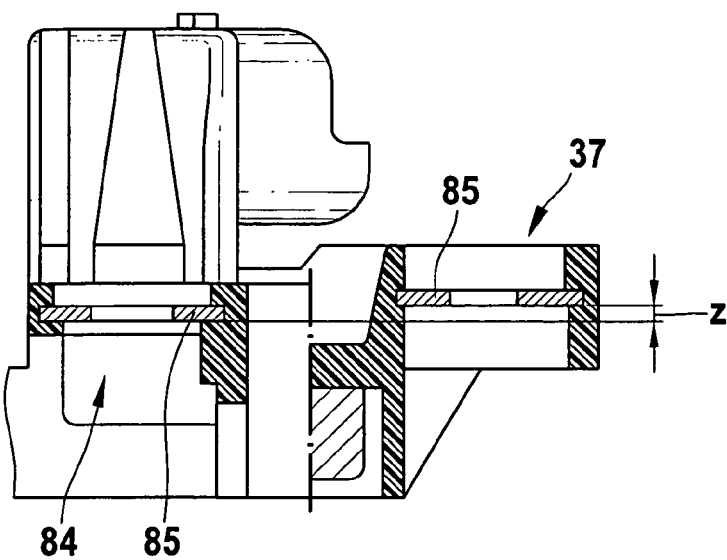
FIG. 3 is a detail showing a section through the regulator unit.

It is provided that the second through opening 37 and the further fastening point 84 each have one bearing face 85 for a mounting element (screw), and the bearing faces 85 are located at different levels in the axial direction (equal to axis of rotation of the rotor) of the through opening, preferably being spaced apart in this direction by up to 5 mm. The different levels are intended to be spaced apart by up to z=5 mm in the aforementioned direction. In a second approximation, a spacing of up to 2.7 mm is provided; see also FIG. 3.

A fourth fastening point 86 is also provided, which is also called a V terminal. This fourth fastening point 86 is intended to be connected to a contact of a connection plate, not shown here. This is meant to be done by means of a bolt element, such as a screw. This fourth fastening point 86 is located between the first through opening 34 and the generator axis. It is provided that the fourth fastening point 86 is located in a corridor between the first through opening 34 and the generator axis, and the corridor, with respect to a connecting line between the first through opening 34 and the generator axis, amounts to a width $b_K$ of between +3 mm and −3 mm. A corridor of between +1 mm and −1 mm (FIG. 2) is especially preferred. The contemplated value is 0.9 mm. This provision leads to better guidance of the cooling air.

Figure 4:
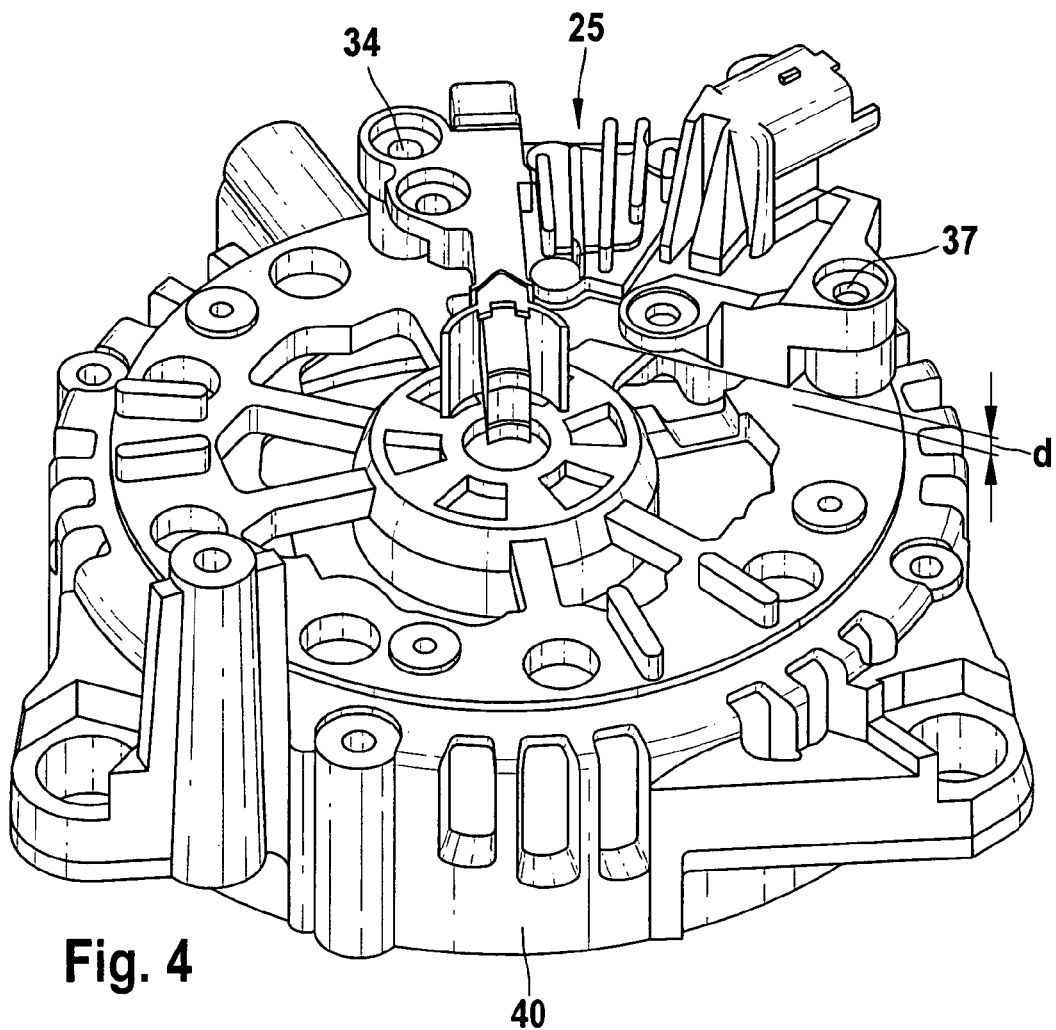
FIG. 4 is a three-dimensional view of a regulator unit and its location on a housing part.
Figure 5:
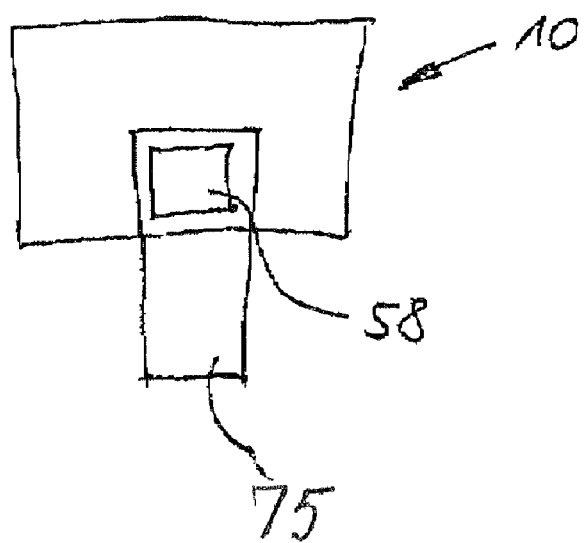
FIG. 5 shows a connection plate and its fastening point.

FIG. 4 is a three-dimensional view of the regulator unit 10 and its position on a housing part 40 of the generator. The first through opening 34 and the second through opening 37 are intended to serve, by means of bolt elements not shown, for fastening the regulator unit 10 to the housing 40.

Figure 6:
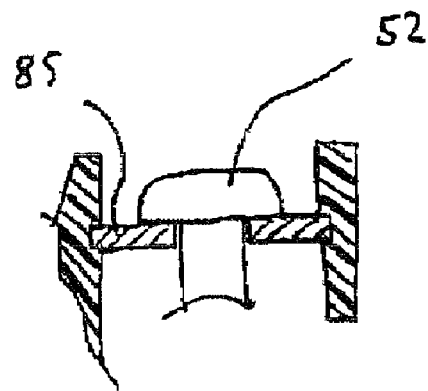
FIG. 6 shows a mounting element positioned on a bearing face according to FIG. 3.

As shown in FIG. 6, for the generator, it is provided that it has, among other elements, the housing 40 and the regulator unit 10, and this regulator unit is fastened by means of two bolt elements to a rectifier heat sink and to a connection plate 75. The generator has an axis of rotation 55, from which the first through opening 34 has a spacing R1 and the second through opening 37 has a spacing R2, and R1 is between 5% and 10% greater. The fastening point 58 serves the purpose of contacting and fastening to a connection plate 75 and is located between the first through opening 34 and the axis of rotation 55. The fastening point 58 is located in a corridor between the first through opening 34 and the axis of rotation 55, and the corridor amounts to between +3 mm and −3 mm with respect to a connecting line between the first through opening 34 and the axis of rotation 55. The regulator housing portion 25 has a spacing from the end plate 40 in the direction of the axis of rotation of between 0.5 and 5 mm, and preferably between 1.8 and 3.2. The regulator unit 10 is fastened to the housing 40 by means of the two bolt elements in such a way that it is optionally prestressed by means of bearing points.

The invention claimed is:

1. A regulator unit for varying an exciter current, comprising:

a housing (13) having a wiper contact mounting region (16) with a guide (19) and wiper contacts (22) seated therein;

a regulator housing portion (25), in which an electronic controller unit and a regulator heat sink (28) are received;

a plug element (31) for electrically connecting the regulator unit (10) to external contact elements, and the regulator unit (10) having a first through opening (34) and a second through opening (37), wherein the regulator unit (10) is fastenable via said openings to a housing (40) with two bolt elements (34), wherein the regulator heat sink (28) is located between the wiper contact mounting region (16) and the plug element (31), wherein the wiper contact mounting region (16) is located asymmetrically between the first through opening (34) and the second through opening (37), and wherein the guide (19) of the wiper contact mounting region (16) has a center line (43) oriented in a direction of motion of the wiper contacts (22), and the first through opening (34) has an angular spacing a from the center line (43), and the second through opening (37) has an angular spacing b from the center line (43), and the ratio between b and a is between 5.2 and 6.0.

2. The regulator unit in accordance with claim 1, wherein the guide (19) of the wiper contact mounting region (16) has a center line (43), whose shortest spacing from the first through opening (34) is at maximum 20 mm.

3. The regulator unit in accordance with claim 1, wherein between the second through opening (37) and the wiper contact mounting region (16), there is a further fastening point (84), whose spacing from the second through opening (37) is between 11 mm and 36 mm.

4. The regulator unit in accordance with claim 3, wherein the second through opening (37) and the further fastening point (84) each have one bearing face (49) for a mounting element (52), and the bearing faces (49) are located at different levels in the axial direction of the through opening, preferably being spaced apart in this direction by up to 5 mm.

5. The regulator unit in accordance with claim 1, wherein the wiper contact mounting region (16) and the plug element (31) are located between the first through opening (34) and the second through opening (37).

6. The regulator unit in accordance with claim 1, wherein the wiper contact mounting region (16) with its guide (19), the regulator housing portion (25), and the plug element (31) are integrally with one another a single housing part.

7. A generator for motor vehicles, having a housing (40) and a regulator unit (10) in accordance with claim 1, wherein the regulator unit is fastened by means of two bolt elements to a rectifier heat sink and to a connection plate.

8. The generator in accordance with claim 7, wherein the generator has an axis of rotation (55), from which the first through opening (34) has a spacing R1 and the second through opening (37) has a spacing R2, and R1 is greater by between 5% and 10%.

9. The generator in accordance with claim 8, wherein one fastening point (58) serves the purpose of contacting and fastening to a connection plate (75) and is located between the first through opening (34) and the axis of rotation (55).

10. The generator in accordance with claim 9, wherein the fastening point (58) is located in a corridor between the first through opening (34) and the axis of rotation (55), and the corridor amounts to between +3 mm and −3 mm with respect to a connecting line between the first through opening (34) and the axis of rotation (55).

11. The generator in accordance with claim 7, wherein the regulator housing portion (25) has a spacing from the end plate (40) in the direction of the axis of rotation of between 0.5 and 5 mm, and preferably between 1.8 and 3.2.

12. The generator in accordance with claim 7, wherein the regulator unit (10) is fastened to the housing (40) by means of the two bolt elements in such a way that it is prestressed by means of bearing points.

13. The generator in accordance with claim 1, wherein the ratio between b and a is between 5.4 and 5.6.

* * * * *